United States Patent [19]

Otsuka et al.

[11] Patent Number: 5,401,229
[45] Date of Patent: Mar. 28, 1995

[54] AUTOMATIC MACHINING APPARATUS

[75] Inventors: Hiroshi Otsuka, Kasugai; Kimiaki Yoshida, Komaki; Shinjiro Nishiki, Ibaraki; Suzushi Takao, Suita; Tsutomu Imamura, Amagasaki, all of Japan

[73] Assignee: Daifuku Co., Ltd., Osaka, Japan

[21] Appl. No.: 81,666

[22] Filed: Jun. 23, 1993

[30] Foreign Application Priority Data

Jul. 2, 1992 [JP] Japan .................. 4-175205
Aug. 21, 1992 [JP] Japan .................. 4-222471

[51] Int. Cl.$^6$ .................. B23Q 3/155; B65G 43/00; G05B 19/00
[52] U.S. Cl. .................. 483/15; 198/465.1; 364/474.11; 364/474.21; 483/9
[58] Field of Search .................. 483/4, 5, 8, 9, 11, 483/14, 15; 198/346.1, 346.2, 465.1, 464.1; 364/474.21, 474.11, 478

[56] References Cited

U.S. PATENT DOCUMENTS

| | | | |
|---|---|---|---|
| 4,646,245 | 2/1987 | Prodel et al. | 364/478 |
| 4,698,766 | 10/1987 | Entwistle et al. | 364/474.21 |
| 4,821,198 | 4/1989 | Takeuchi | 483/4 |
| 5,109,973 | 5/1992 | Hirano | 198/465.1 X |
| 5,193,421 | 3/1993 | Meisinger | 483/9 X |
| 5,244,447 | 9/1993 | Tanaka et al. | 483/4 X |
| 5,310,396 | 5/1994 | Momoi et al. | 483/15 |

FOREIGN PATENT DOCUMENTS

| | | | |
|---|---|---|---|
| 155662 | 9/1985 | European Pat. Off. | 483/9 |
| 120945 | 6/1987 | Japan | 483/9 |
| 321129 | 12/1989 | Japan | 483/9 |
| 237730 | 9/1990 | Japan | 483/8 |
| 4-372323 | 12/1992 | Japan | 483/14 |
| 774918 | 10/1980 | U.S.S.R. | 483/15 |

*Primary Examiner*—William Briggs
*Attorney, Agent, or Firm*—Webb Ziesenheim Bruening Logsdon Orkin & Hanson

[57] ABSTRACT

An automatic machining apparatus includes a rack for storing workpieces mounted on pallets, setting stations for setting the workpieces on the pallets, processing machines for processing the workpieces according to specified processing information, and a stacker crane for transporting the workpieces on the pallets between the rack and setting stations and between the rack and processing machines. The entire apparatus is operable under control of a main controller, with the processing machines controlled by an auxiliary controller. Each pallet carries an IC card for storing information on treatment done to the workpiece mounted thereon. The main controller includes a first communicating device for writing the information on treatment into the IC card. The auxiliary controller includes a second communicating device for reading the information on treatment from the IC card.

19 Claims, 5 Drawing Sheets

AUTOMATIC MACHINING APPARATUS

BACKGROUND OF THE INVENTION

1. FIELD OF THE INVENTION

This invention relates to automatic machining apparatus. More particularly, the invention relates to an automatic machining apparatus having a storage device for storing workpieces, pallets, jigs for use in setting the workpieces on the pallets, and untreated, half-treated or finished products each including a workpiece on a pallet; a setting device for setting the workpieces on the pallets by using the jigs; automatically controllable processing machines for automatically processing the workpieces according to specified processing information; and a transport device for transporting the workpieces, pallets, jigs, and untreated or half-treated products between the storage device and setting device, and transporting the untreated, half-treated or finished products between the storage device and processing machines.

2. DESCRIPTION OF THE RELATED ART

The automatic machining apparatus constructed as above is aimed at an FMS which is an automated physical distribution system in a machining plant. Conventionally, a single, common control device is used to control a schedule of the entire apparatus and operation of the processing machines. The schedule of the entire apparatus includes control of types of treatment done to workpieces and operation of the transport device. These involve varied processes such as transporting workpieces or other elements from the storage device to the setting device, storing untreated products set by the setting device in the storage device, and feeding the untreated products from the storage device to the processing machines. The control of the processing machines includes, for example, control of NC data necessary for the processing machines to process the untreated products fed thereto.

When the processing machines are changed, for example, an arrangement for controlling the machines must also be altered. In the prior apparatus controlled by the single, common control device, however, the entire control device must be altered even where only the processing machines are changed. Consequently, the prior apparatus has the disadvantage that the alteration of the control device requires considerable trouble, time and cost.

In a conventional control of tools, on the other hand, detailed information on characteristics of each tool such as measured information on an axial length and tip configuration of each drill acting as a tool (a tool life such as the number of times the tool can be used may be determined from this information) is included in tool stockpile information or tool storage information. Such information is handled by a single, common control device which also controls the tools and operation of processing machines (see, for example, U.S. Pat. Nos. 4,369,563 and 4,621,410).

However, the prior control system is complicated as a whole with immense tool control information. The complication arises from use of the common control device for controlling the detailed information on characteristics of each tool used in machining, as well as operation of the processing machines and arrangement of the tools. The entire common control device must be altered when the tool control system is changed with change of the tools in consequence of or irrespective of change of processing machines. As a result, the prior apparatus has the disadvantage that the alteration of the control device requires considerable trouble, time and cost.

SUMMARY OF THE INVENTION

This invention has been made having regard to the state of the art noted above, and its primary object is to provide an automatic machining apparatus for overcoming the disadvantages of the prior art by minimizing alteration of a control system when certain parts of the apparatus, e.g. processing machines, are changed.

Another object of this invention is to simplify a system for controlling processing machines and tools, and to minimize alteration of the control system when the tools are changed.

The above primary object is fulfilled, according to the present invention, by an automatic machining apparatus as noted at the outset hereof, comprising a data storage device provided on the pallets for storing information on types of treatment done to the workpieces, a main control device for controlling treatment of the workpieces and operation of the transport device, and an auxiliary control device for controlling operation of the processing machines, wherein the main control device includes a first communicating device for writing the information on types of treatment into the data storage device, and the auxiliary control device includes a second communicating device for reading the information on types of treatment from the data storage device.

With the above construction, the main control device for controlling treatment of the workpieces and operation of the transport device has the first communicating device for writing the information on types of treatment into the data storage device. The auxiliary control device for controlling operation of the processing machines has the second communicating device for reading the information on types of treatment from the data storage device. Based on the information on types of treatment read, the auxiliary control device controls operation of the processing machines to effect a predetermined treatment of the workpieces.

According to the above construction, the entire automatic machining apparatus is controlled by the two control devices, i.e. the main control device for controlling treatment of the workpieces and operation of the transport device, and the auxiliary control device for controlling operation of the processing machines. The main control device transmits processing instructions to the auxiliary control device through the data storage device included in each pallet. When certain parts of the apparatus, such as the processing machines, are changed, the control system corresponding to the changed parts may be altered only at the auxiliary control device. There is no need for altering the control system of the entire apparatus. The alteration may be made with reduced trouble, time and cost. Consequently, this automatic machining apparatus has the flexibility to cope with changes made to the apparatus.

The auxiliary control device may be operable to write, through the second communicating device, information on results of treatment into the data storage device, and the main control device may be operable to read, through the first communicating device, the information on results of treatment from the data storage device.

With this construction, the second communicating device of the auxiliary control device writes, into the data storage device of pallets to which workpieces are set, information on results of treatment of the workpieces done by the processing machines, e.g. whether the treatment was completed properly or unsatisfactory. The second communicating device of the main control device reads the information on the results of treatment written into the data storage device. The main control device controls transport of the workpieces based on the information on the results of treatment read. Specifically, where the treatment has been done properly and further treatment remains to be effected, the workpieces may be stored as half-treated products in the storage device. Finished workpieces or defectively treated workpieces may be transported to predetermined locations.

As noted above, the information on the results of treatment of workpieces is stored in the pallets to which the treated workpieces are set. A subsequent treatment of the workpieces may be determined correctly from the information stored. Consequently, this automatic machining apparatus is capable of treating workpieces with increased reliability.

In a further aspect of this invention, an automatic machining apparatus comprises a tool measuring device for measuring characteristics of tools, wherein each of the tools or trays for supporting the tools includes a tool data storage device for storing information on the characteristics of the tool obtained by the tool measuring device, a control device includes a first communicating device for writing the information on characteristics of the tools obtained by the tool measuring device into the tool data storage device, and the control device or the processing machines include(s) a second communicating device for reading the information on characteristics of the tools from the tool data storage device.

With this construction, characteristics of the tools are measured, and the characteristics information thereby obtained is written by the first communicating device provided for the control device which controls operation of the processing machines and use of the tools, into the tool data storage device provided for the tools measured or for the trays supporting the tools. Where the control device has the second communicating device, the control device determines use conditions and the like of the tools based on the characteristics information of the tools read, and sets the tools to the processing machines to effect a predetermined treatment of workpieces. Where the processing machines have the second communicating device, the processing machines determine use conditions and the like of the tools based on the characteristics information of the tools read, and the tools are set to the processing machines to effect a predetermined treatment of workpieces.

Thus, according to this invention, detailed information on characteristics of the tools used in the treatment is stored in the tools or trays. The entire control system is simplified by avoiding immense tool control information. When the tools are changed, requiting the tool control system to be altered, the simplified control system may be altered with reduced trouble, time and cost. Consequently, this automatic machining apparatus is simple and has the flexibility to cope with changes made to the apparatus.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

An automatic machining apparatus embodying the present invention will be described in detail with reference to the drawings.

Figure 3:
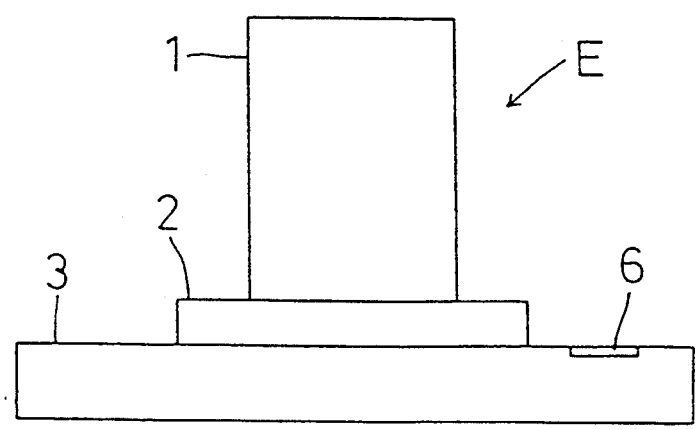
FIG. 3 is a schematic side view of a workpiece before processing or halfway through the processing.

As shown in FIG. 3, a workpiece 1 is fixedly supported through a jig 2 on a pallet 3. An untreated or half-treated (i.e. partly treated but not yet finished) product E including the workpiece 1 set to the pallet 3 is transported to a processing machine to be worked. The pallet 3 includes an IC card 6 acting as a data storage for storing information on the type, progress and the like of treatment done to the workpiece 1.

Figure 2:
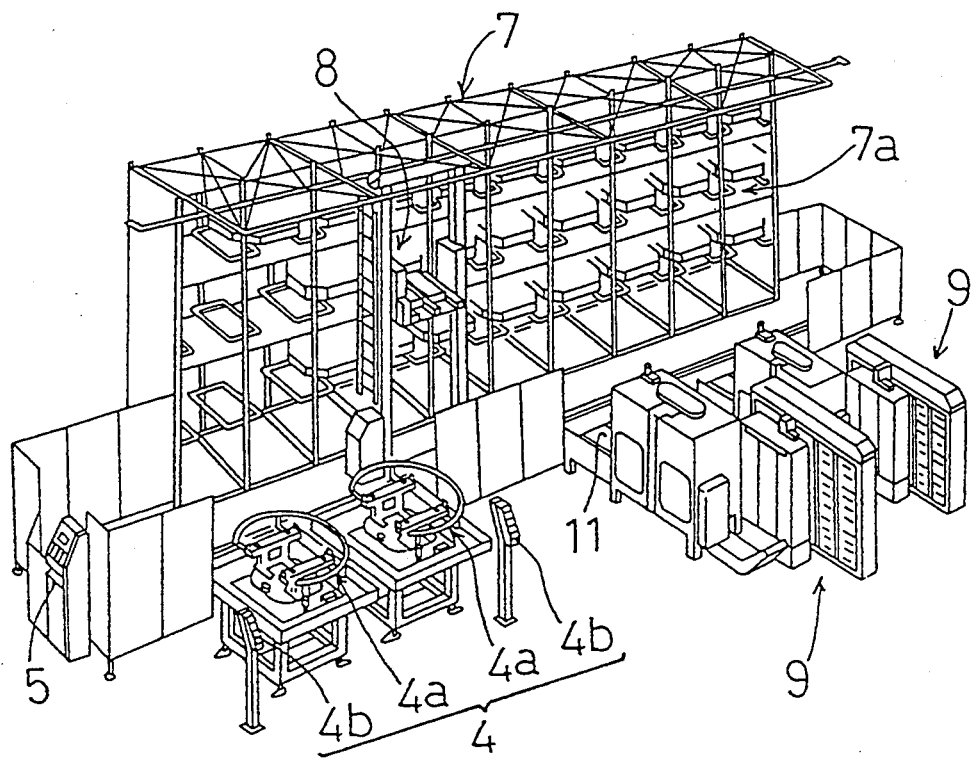
FIG. 2 is a perspective view of the automatic machining apparatus.

As shown in FIG. 2, the apparatus includes an automated storage type rack 7 having a plurality of depositories 7a arranged horizontally and vertically for storing workpieces 1, jigs 2, pallets 3, and untreated, half-treated or finished products E. Unfinished workpieces 1 and jigs 2 are stored as mounted on pallets 3 instead of being stored separately and individually.

A stacker crane 8 is provided to run along guide rails in front of the rack 7. Two machining centers 9 are installed in one end region of a running track of the stacker crane 8 and opposed to the rack 7 to act as automatically controlled processing machines for automatically processing the workpieces 1 based on specified processing information. Each of the machining centers 9 includes an auto pallet changer (hereinafter abbreviated to APC) 11 opposed to the running track. The untreated or half-treated products E are transferred through the APC 11 between the stacker crane 8 and each machining center 9. Specifically, the APC 11 is operable to move to the machining center 9 an untreated, half-treated or finished product E placed on a portion of the APC 11 adjacent the stacker crane 8. On the other hand, a half-treated or finished product E placed on a portion of the APC 11 adjacent the machining center 9 is moved toward the stacker crane 8.

Two setup stations 4 are installed in the other end region of the running track of the stacker crane 8 and opposed to the rack 7 to act as setting sections for setting the workpieces 1 to the pallets 3 by means of the jigs 2. Each of the setup stations 4 includes a working table 4a, and an indicator/control panel 4b for indicating operating information to a setup worker and processing requests inputted by the worker.

Figure 1:
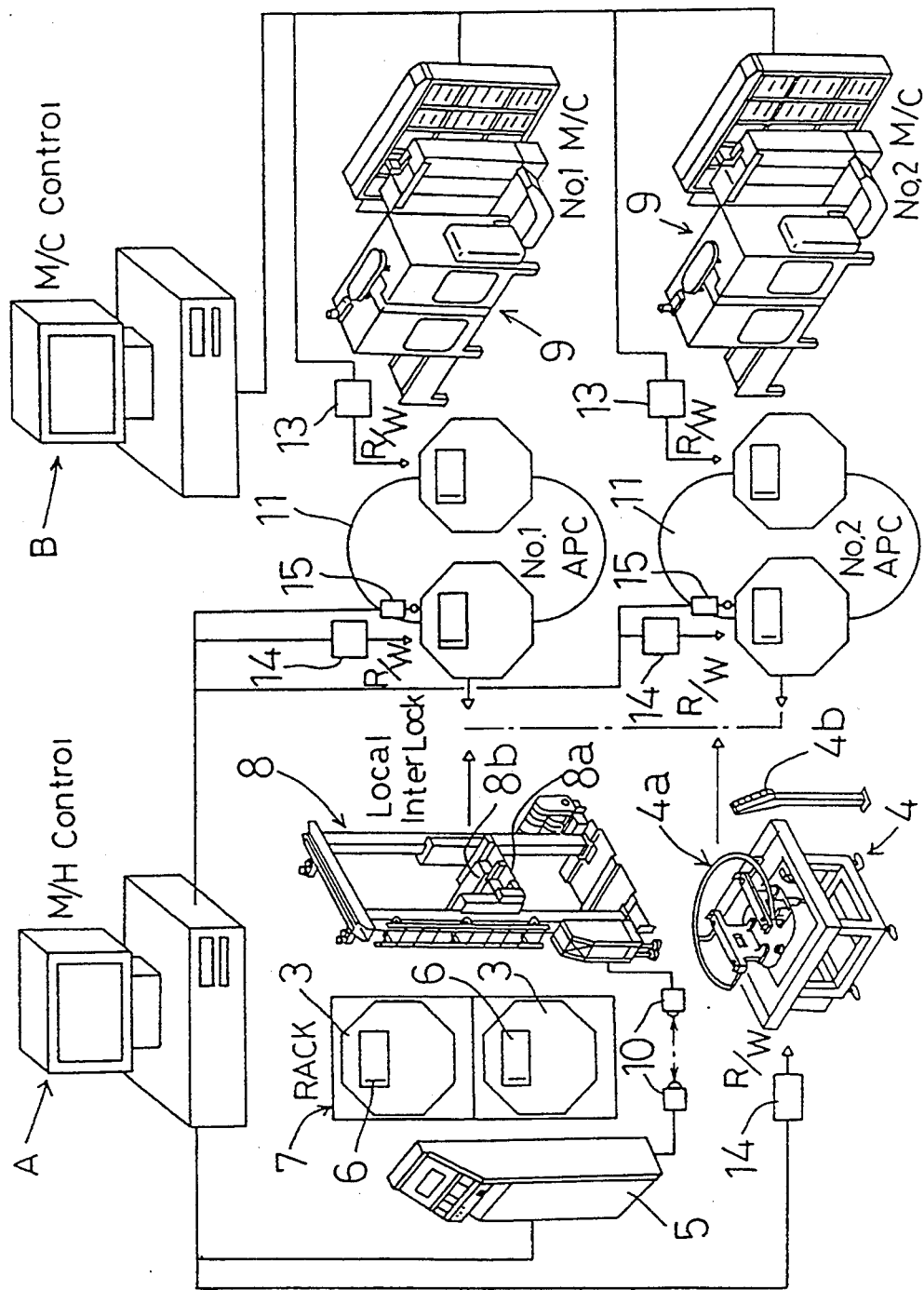
FIG. 1 is a schematic overall view of an automatic machining apparatus according to the present invention.

A crane controller 5 is installed in an end position of the running track of the stacker crane 8 adjacent the setup stations 4. The crane controller 5 and stacker crane 8 communicate to each other through a pair of optical transmitters 10 (FIG. 1). The stacker crane 8 includes a vertically movable lift 8a. The lift 8a includes a slide fork 8b slidable transversely of the running track. The slide fork 8b is slidable toward the depositories 7a of the rack 7, the working tables 4a of the setup stations 4 and the APCs 11. The slide fork 8b may transfer a workpiece 1, pallet 3 and the like from a depository 7a of the rack 7 to the lift 8a, whereafter the workpiece 1, pallet 3 and the like are transported to one of the setup stations 4 for setting of an untreated product E. Conversely, an untreated product E set at one of the setup stations 4 may be transported to the rack 7 for storage. An untreated product E may be transported from the rack 7 toward the machining centers 9 and transferred to one of the APCs 11. Or a half-treated or finished product E may be returned from one of the machining centers 9 to the rack 7 for storage.

Thus, the stacker crane 8 acts as a transport device for transporting workpieces 1, pallets 3, jigs 2, and untreated or half-treated products E between the rack 7 and setup stations 4, and transporting untreated, half-treated or finished products E between the rack 7 and machining centers 9. An interlock function regarding movement of the slide fork 8b is provided between the stacker crane 8 and setup stations 4 and between the stacker crane 8 and APCs 11 to avoid a collision between pallets 3 or other articles supported during sliding movement of the slide fork 8b. Specifically, load conditions at opposite sides are communicated and confirmed through optical transmitters not shown (FIG. 1).

A control system of the apparatus will be described next. As shown in FIG. 1, the system includes an M/H controller A acting as a main control device for controlling the type, progress and the like of treatment done to workpieces 1 and controlling operation of the stacker crane 8, and an M/C controller B acting as an auxiliary control device for controlling operation of the machining centers 9 (including APCs 11). The M/H controller A controls a processing schedule of the entire system such as the number and type of workpieces 1 fed to the machining centers 9, start of treatment, interruption of the treatment, checking of each process, and so on. The M/C controller B controls NC data (direct control data for operating the machining centers 9) for processing the workpieces 1 fed under control of the M/H controller A.

The M/H controller A transmits processing instructions to the M/C controller B in the form of information stored on the IC cards 6. For this purpose, the M/H controller A has first IC card reader/writers 14 acting as a first communicating device for writing information on the type of treatment on the IC cards 6. Specifically, when an untreated product E is set in place at one of the setup stations 4, the IC card reader/writer 14 associated therewith writes the type of treatment to be done to the workpiece 1 on the pallet 3.

The M/C controller B has second IC card reader/writers 13 acting as a second communicating device for reading the information on the type of treatment written on the IC cards 6. Specifically, when the workpiece 1 of an untreated or half-treated product E is on one of the APCs 11 adjacent the machining center 9, the IC card reader/writer 13 reads the information on the type of treatment to be done to the workpiece 1.

The M/C controller B causes each second IC card reader/writer 13 to write information on results of treatment on the IC card 6. Specifically, the IC card reader/writer 13 writes information on results of treatment (e.g. properly treated or faulty treatment) of the workpiece 1 of a product E done by one of the machining centers 9 and placed on the APC 11 adjacent the machining center 9.

The M/H controller A causes each first IC card reader/writer 14 to read the information on results of treatment written by the second IC card reader/writer 13. Specifically, the M/H controller A has further first IC card reader/writers 14 disposed on the APCs 11 adjacent the stacker crane 8. Each of these IC card reader/writers 14 reads the information on results of treatment of a workpiece 1 placed on the APC 11. The M/H controller A further includes load sensors 15 disposed on the APCs 11 adjacent the stacker crane 8 for confirming presence of products E on the APCs 11.

Another embodiment will be described next.

Figure 5:
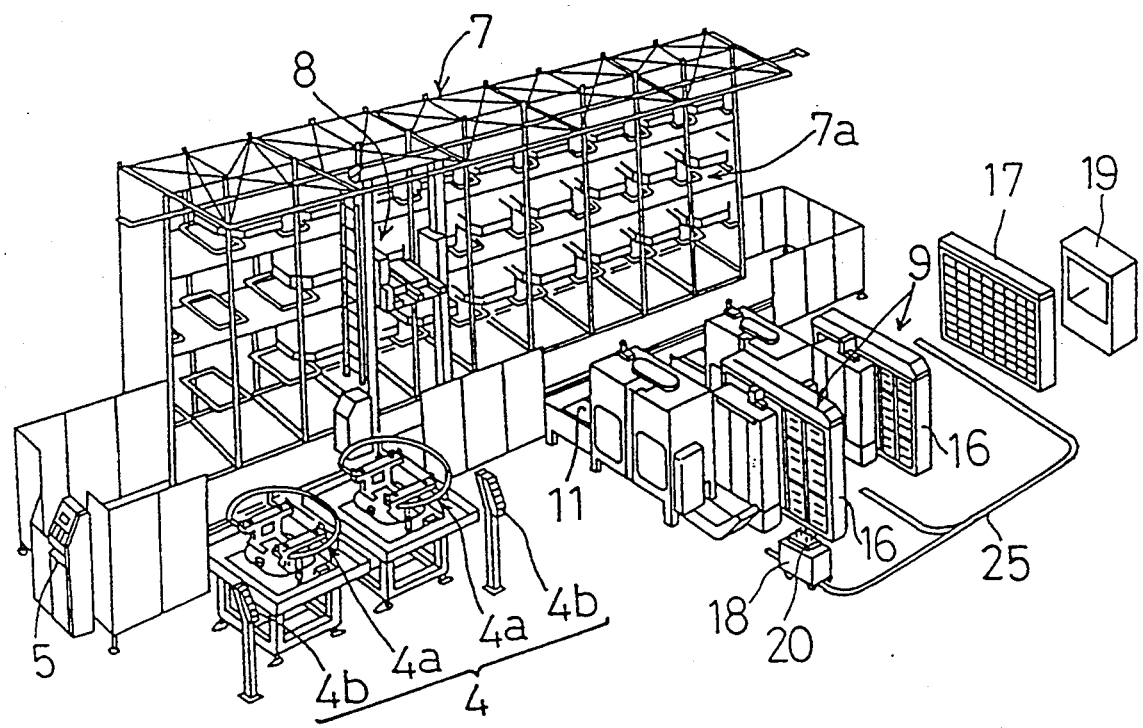
FIG. 5 is a perspective view of the automatic machining apparatus shown in FIG. 4.
Figure 6:
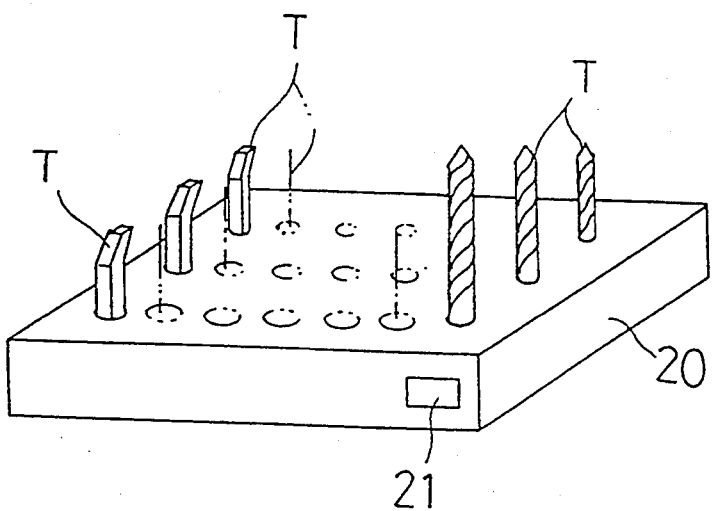
FIG. 6 is a schematic perspective view of a tool tray used in the automatic machining apparatus shown in FIG. 4.
Figure 7:
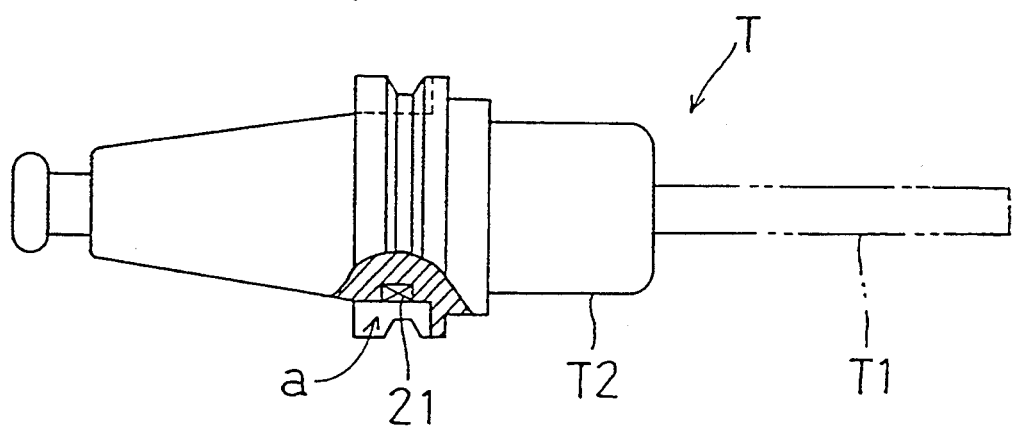
FIG. 7 is a side view, partly in section, of a tool including a tool data storage in a further embodiment of the invention.

In this embodiment, a set of tools T is supplied to the machining centers 9 as fitted in a tray 20 in the form of a flat board, as shown in FIG. 6, to be used in the machining centers 9. As shown in FIG. 7, each tool T includes a main tool body T1 and a holder T2 rigidly connected to each other. As shown in FIG. 5, each of the machining centers 9 has a tool magazine 16 for storing a plurality of trays 20. Thus, the tool magazine 16 acts as a tool storage device provided for each machining center 9 to store the tools T used in the machining center 9.

A tool stocker 17 is provided to act as a centralized tool reserving device for keeping reserve tools T to be supplied to the machining centers 9. The tool stocker 17 has a fixed shelf structure including a plurality of depositories arranged vertically and horizontally to store the trays 20. An automotive carriage 18 acts as a tool transport device for transporting the the tools T between the tool stocker 17 and each tool magazine 16 and between the two tool magazines 16. The automotive carriage 18 is controlled by a carriage controller 24 (FIG. 4) through radio communication to run along guide lines 25.

A tool presetter 19 is provided to act as a tool measuring device for setting the tools T to the tray 20, and measuring characteristics of the tools T, such as axial lengths and tip shapes (degrees of wear) of drills used as tools T, after a predetermined period of use. Each tray 20 includes an IC card 21 (FIG. 6) acting as a tool data storage device for storing information on characteristics of tools T obtained through the tool presetter 19. The tray 20 to which the tools T are set is transferred to the tool stocker 17 to be stored in a predetermined one of the depositories.

Figure 4:
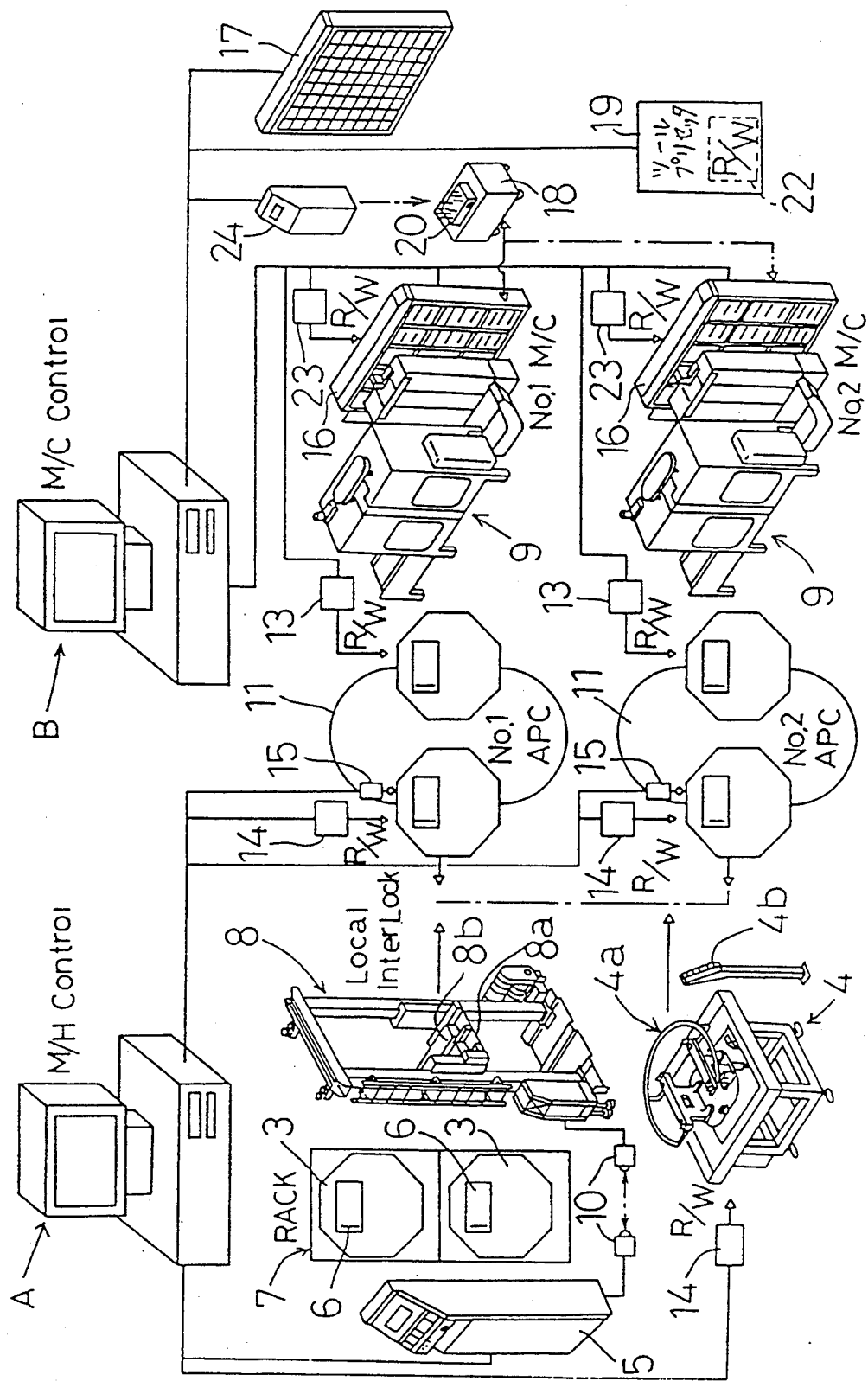
FIG. 4 is a schematic overall view of an automatic machining apparatus in a further embodiment of the invention.

A control system of this apparatus will be described next. As shown in FIG. 4, the system includes an M/H controller A acting as a main control device for controlling the type, progress and the like of treatment done to workpieces 1 and controlling operation of the stacker crane 8, and an M/C controller B acting as a control device for controlling information on tool reserves at the tool stocker 17, information on tool storage at the tool magazines 16, operation of the automotive carriage 18, and operation of the machining centers 9 (including APCs 11). The M/H controller A controls a processing schedule of the entire system such as the number and type of workpieces 1 fed to the machining centers 9, start of treatment, interruption of the treatment, checking of each process, and so on. The M/C controller B controls NC data (direct control data for operating the machining centers 9) for processing the workpieces 1 fed under control of the M/H controller A, and the processing tools T used at the machining centers 9.

The M/H controller A transmits processing instructions to the M/C controller B in the form of information stored on the IC cards 6.

Finished products E are those for which confirmation has been made of all processes having completed properly.

As shown in FIG. 4, the M/C controller B is connected to a third IC card reader/writer 22 mounted in the tool presetter 19 to act as a third communicating device for writing the information on characteristics of tools T obtained by the tool presetter 19 into the IC card 21 on each tray 20.

Further, the M/C controller B is connected to IC card reader/writers 23 provided for the respective tool magazines 16 to act as a fourth communicating device for reading the information on characteristics of tools T written into the IC card 21 on each tray 20.

A mode of using the information on characteristics of the tools T will be described. The tools T are arranged on each tray 20 according to a processing layout. Each tool T has a tool number including a tray number or group number and an ID number corresponding to an order of the processing layout. The characteristics information measured is written as corresponding to the tool numbers in the IC card 21 on each tray 20. The information on characteristics of the tools T read by the fourth IC card reader/writer 23 provided for the tool magazines 16 is transmitted along with a processing program from the M/C controller B to the machining centers 9 (actually to control units of the machining centers). Based on the processing program, each machining center 9 controls an automatic tool changer (ATC) to attach a tool T to a main spindle for machining workpieces 1. At this time, the characteristics information transmitted is used to effect fine adjustment of conditions for using the tools T, e.g. to effect a predetermined amount of amendment in feeding each tool T, based on data of a length of the tool T, with respect to a standard condition. After machining with the above tool T, the fourth IC card reader/writer 23 writes information on use in machining of the tool T (e.g. satisfactory machining, a trouble in machining, or damage to the tool) as corresponding to the tool number into the IC card 21 on the tray 20. The above tool use information is used for processing other workpieces 1 and for changing the tools T.

Other embodiments will be described hereinafter. In the foregoing embodiments, the storage device is in the form of an automated storage type rack 7 having a plurality of depositories 7a arranged horizontally and vertically. This is not limitative but other forms of storage device may be used. The illustrated single-row rack 7 may be replaced with racks in a plurality of rows.

In the foregoing embodiments, the setup stations 4 include two working tables to enable two setup operations. The number of working tables is not limited to two. Specific constructions of the working tables and other parts of the setup stations 4 may be varied as desired.

In the foregoing embodiments, untreated products E set at the setup stations 4 are transported to and stored in the storage device 7 by the stacker crane 8 acting as the transport device associated with the storage device. The stacker crane 8 may be replaced with an unmanned transport vehicle for transporting the products from the setup stations 4 to the storage device 7.

In the foregoing embodiments, the transport device comprises the stacker crane 8, which may be replaced with an unmanned vehicle as noted above.

In the foregoing embodiments, the machining centers 9 include two automatically controlled processing machines. Depending on operating conditions such as types of workpieces, types of treatment, number of workpieces to be fed, and so on, the machining centers 9 may be replaced with simple processing machines each for automatically carrying out one treatment in response to a start command. The number of processing machines is not limited to two, but may be one, three or more. In the foregoing embodiments, the data storage device includes IC cards 6. Instead of the IC cards, the data storage device may be other types of storage device such as ID tags which are electromagnetic storage media. The first and second communicating devices 13 and 14 for writing and reading information into/from the data storage device 6 may be other types of communicating devices, instead of the IC card reader/writers, to suit other types of storage device.

In the foregoing embodiment, the tool reserving device 17 has a fixed shelf structure including a plurality of depositories arranged vertically and horizontally. Other storage modes may be employed for the tool reserving device 17.

In the foregoing embodiment, the tool transport device is in the form of the automotive carriage 18 for running along the guide lines 25 on the floor. This may be replaced with an automotive monorail carriage suspended from an elevated guide rail.

In the foregoing embodiment, the tool measuring device is in the form of the tool presetter 19 for setting the tools T to the tray 20. The tool measuring device may be formed separately from a tool setting device.

In the foregoing embodiment, the data storage device 6 and tool data storage device 21 are in the form of IC cards for storing information in a non-contact mode by radio communication. Other, contact type data storage devices may be used instead. With such change of the data storage device 6 and tool data storage device 21, the communicating devices (i.e. IC card reader/writers 13, 14, 22 and 23) are replaced with other types of communicating devices for writing and reading information into/from the data storage device 6 and tool data storage device 21.

In the foregoing embodiment, the tool data storage device 21 is provided on the plate-like tray 20 for supporting the tools T. As shown in FIG. 7, a tool data storage device 21 may be provided directly on each tool T. In the illustrated example, the tool data storage device (IC card 21) is embedded in a cutout position "a" peripherally of the holder T2 for receiving power from a main spindle. A second communicating device (a fourth IC card reader/writer 23) is provided on the main spindle for reading information from the tool data storage device 21. In accordance with this construction, the tool storage device (tool magazines 16) comprises a belt conveyer type to support each tool T on a belt. The tool reserving device (tool stocker 17) stores each tool T1 in one depository. The tool transport device (automotive carriage 18) transports one tool T at a time.

In above embodiment, the control device (M/C controller B) has the second communicating device (fourth IC card reader/writer 23) for reading the characteristics information from the tool T. The second communicating device 23 may be provided on each processing machine 9 (actually on the control unit thereof). In this case, the control device B transmits only the processing program (including standard processing data) to the processing machines 9. Amendments to processing conditions with respect to the standard data are carried out based on the characteristics information read by the processing machines 9. This diminishes the load of the control device B, to enhance simplification of the control system.

Specific constructions of the various components necessary for working this invention may be modified in many other ways.

What is claimed is:

1. An automatic machining apparatus comprising:
   storage means for storing workpieces, pallets, jigs for use in setting said workpieces on said pallets, and untreated, half-treated or finished products each including a workpiece on a pallet;
   setting means for setting said workpieces on said pallets by using said jigs;
   automatically controllable processing machines for automatically processing said workpieces according to specified processing information;
   transport means for transporting said workpieces, said pallets, said jigs, and said untreated or half-treated products between said storage means and said setting means, and transporting said untreated, half-treated or finished products between said storage means and said processing machines;
   data storage means provided on said pallets;
   main control means for controlling processing of said workpieces and operation of said transport means; and
   auxiliary control means for controlling operation of said processing machines;
   wherein said main control means includes first communicating means for writing information on the types of processing to be done to said workpieces onto said data storage means;
   wherein said auxiliary control means includes second communicating means for reading said information on the types of processing to be done to said workpieces from said data storage means;
   wherein said auxiliary control means is operable to write, through said second communicating means and onto said data storage means, information on results of processing done to said workpieces;
   wherein said main control means is operable to read, through said first communicating means and from said data storage means, said information on the results of processing done to said workpieces so that said workpieces are transported based on said read information on the results of processing done to said workpieces; and
   wherein said information on the results of processing done to said workpieces includes information indicative of whether the processing has been carried out properly.

2. An automatic machining apparatus comprising:
   storage means for storing workpieces, pallets, jigs for use in setting said workpieces on said pallets, and untreated, half-treated or finished products each including a workpiece on a pallet;
   setting means for setting said workpieces on said pallets by using said jigs;
   automatically controllable processing machines for automatically processing said workpieces according to specified processing information;
   transport means for transporting said workpieces, said pallets, said jigs, and said untreated or half-treated products between said storage means and said setting means, and transporting said untreated, half-treated or finished products between said storage means and said processing machines;
   data storage means provided on said pallets;
   main control means for controlling processing of said workpieces and operation of said transport means; and
   auxiliary control means for controlling operation of said processing machines;
   wherein said main control means includes first communicating means for writing information on the types of processing to be done to said workpieces onto said data storage means;
   wherein said auxiliary control means includes second communicating means for reading said information on the types of processing to be done to said workpieces from said data storage means;
   tool reserving means for keeping processing tools;
   tool storage means provided for said processing machines to store said tools for use by the processing machines;
   tool transport means for transporting said tools between said tool reserving means and said tool storage means;
   control means for controlling information on tool reserves at said tool reserving means, information on tool storage at said tool storage means, operation of said tool transport means and operation of the processing machines; and
   tool measuring means for measuring characteristics of said tools,
   wherein each of said tools or trays for supporting said tools includes tool data storage means for storing said information on characteristics of the tool obtained by said tool measuring means,
   wherein said control means includes third communicating means for writing said information on characteristics of the tools obtained by said tool measuring means into said data storage means, and
   wherein said control means for said processing machines include fourth communicating means for reading said information on characteristics of the tools from said data storage means.

3. An automatic machining apparatus as defined in claim 1, wherein said storage means comprises an automatic storage type rack including a plurality of depositories arranged vertically and horizontally.

4. An automatic machining apparatus as defined in claim 1, wherein said setting means comprises setup stations each including includes a working table, and an indicator/control panel for indicating operating information to a setup worker and processing requests inputted by the worker.

5. An automatic machining apparatus as defined in claim 1, wherein said automatically controllable processing machines comprise machining centers.

6. An automatic machining apparatus as defined in claim 1, wherein said transport means comprises a stacker crane operable to run along guide rails.

7. An automatic machining apparatus as defined in claim 1, wherein said data storage means comprises IC cards.

8. An automatic machining apparatus as defined in claim 1, wherein said first communicating means and said second communicating means comprise IC card reader/writers.

9. An automatic machining apparatus comprising:
   storage means for storing workpieces, pallets, jigs for use in setting said workpieces on said pallets, and untreated, half-treated or finished products each including a workpiece on a pallet;
   setting means for setting said workpieces on said pallets by using said jigs;
   automatically controllable processing machines for automatically processing said workpieces according to specified processing information;
   transport means for transporting said workpieces, said pallets, said jigs, and said untreated or half-treated products between said storage means and said setting means, and transporting said untreated, half-treated or finished products between said storage means and said processing machines;
   tool reserving means for keeping processing tools;
   tool storage means provided for said processing machines to store said tools for use by the processing machines;
   tool transport means for transporting said tools between said tool reserving means and said tool storage means;
   control means for controlling information on tool reserves at said tool reserving means, information on tool storage at said tool storage means, operation of said tool transport means, and operation of the processing machines; and
   tool measuring means for measuring characteristics of said tools;
   wherein each of said tools or trays for supporting said tools includes tool data storage means for storing said information on characteristics of the tool obtained by said tool measuring means;
   said control means includes third communicating means for writing said information on characteristics of the tools obtained by said tool measuring means into said data storage means; and
   said control means or said processing machines include(s) fourth communicating means for reading said information on characteristics of the tools from said data storage means.

10. An automatic machining apparatus as defined in claim 9, wherein said storage means comprises an automatic storage type rack including a plurality of depositories arranged vertically and horizontally.

11. An automatic machining apparatus as defined in claim 9, wherein said setting means comprises setup stations each including includes a working table, and an indicator/control panel for indicating operating information to a setup worker and processing requests inputted by the worker.

12. An automatic machining apparatus as defined in claim 9, wherein said automatically controllable processing machines comprise machining centers.

13. An automatic machining apparatus as defined in claim 9, wherein said transport means comprises a stacker crane operable to run along guide rails.

14. An automatic machining apparatus as defined in claim 9, wherein said tool reserving means comprises a tool stocker acting as a centralized tool reserving device for keeping reserve tools to be supplied to said processing machines, said tool stocker having a fixed shelf structure including a plurality of depositories arranged vertically and horizontally to store said trays.

15. An automatic machining apparatus as defined in claim 9, wherein said tool transport means comprises an automotive carriage controlled by a carriage controller through radio communication to run along guide lines.

16. An automatic machining apparatus as defined in claim 9, wherein said tool measuring means comprises a tool presetter for measuring axial lengths and tip shapes (degrees of wear) of said tools.

17. An automatic machining apparatus as defined in claim 9, wherein said data storage means comprises IC cards.

18. An automatic machining apparatus as defined in claim 9, wherein said third communicating means and said fourth communicating means comprise IC card reader/writers.

19. An automatic machining apparatus as claimed in claim 2, wherein said third communicating means and said fourth communicating means comprise IC card readers/writers.

* * * * *